Figure 1:
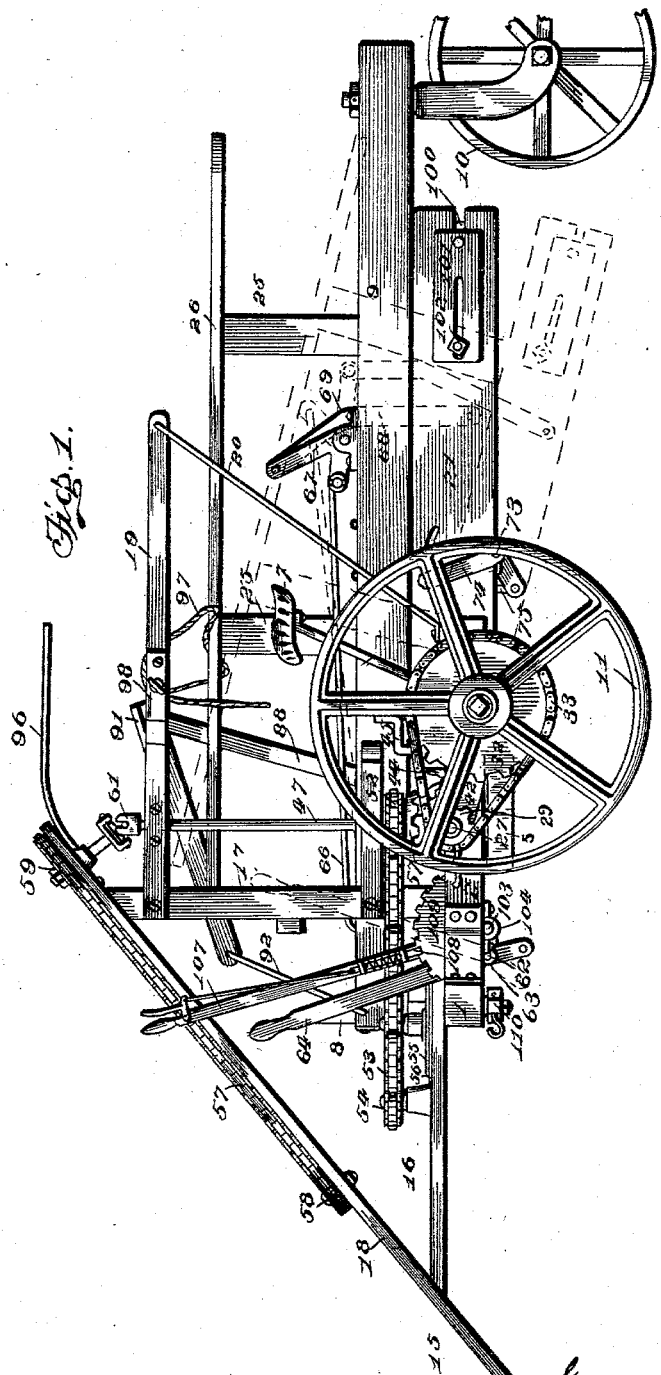

No. 704,839. Patented July 15, 1902.
G. G. KIMMELL.
CORN HARVESTER AND SHOCKER.
(Application filed May 13, 1901.)
(No Model.) 6 Sheets—Sheet 1.

Witnesses
L. G. Handy.
Watts J. Estabrook

Inventor
Grange G. Kimmell
By Chess G. DuBois
his Attorneys

No. 704,839. Patented July 15, 1902.
G. G. KIMMELL.
CORN HARVESTER AND SHOCKER.
(Application filed May 13, 1901.)
(No Model.) 6 Sheets—Sheet 3.

Witnesses
L. G. Handy.
Watts T. Estabrook

Inventor
Granger G. Kimmell
By Rhea G. DuBois
his Attorneys

No. 704,839. Patented July 15, 1902.
G. G. KIMMELL.
CORN HARVESTER AND SHOCKER.
(Application filed May 13, 1901.)
(No Model.) 6 Sheets—Sheet 4.

Witnesses
L. G. Handy.
Watts T. Estabrook

Inventor
Granger G. Kimmell
By Rhea G. D. Bair & Co.
his Attorneys

No. 704,839. Patented July 15, 1902.
G. G. KIMMELL.
CORN HARVESTER AND SHOCKER.
(Application filed May 13, 1901.)
(No Model.) 6 Sheets—Sheet 5.
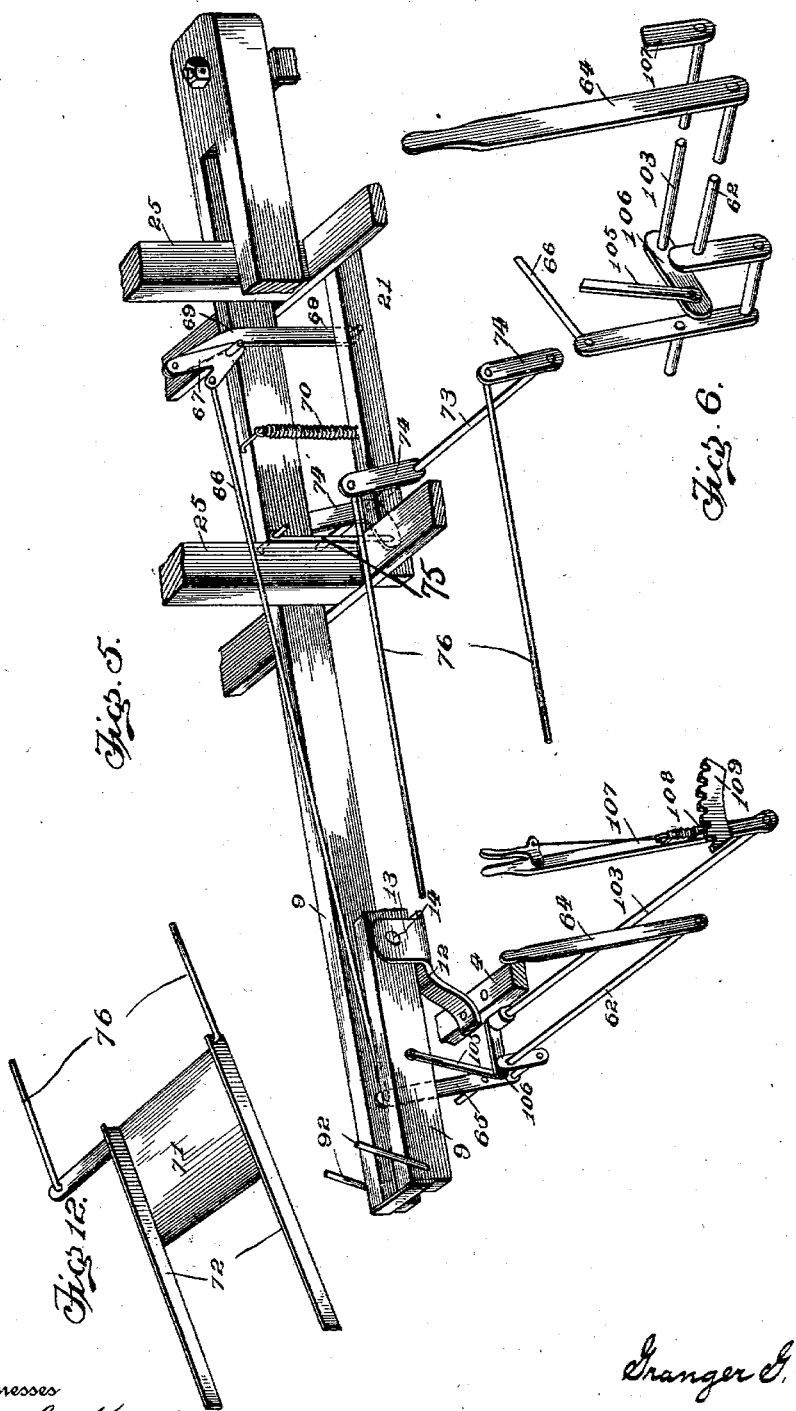
Witnesses
L. G. Handy
Watts T. Estabrook
Inventor
Granger G. Kimmell
By Rhea G. DuBois & Co
his Attorneys No. 704,839. Patented July 15, 1902.
G. G. KIMMELL.
CORN HARVESTER AND SHOCKER.
(Application filed May 13, 1901.)
(No Model.) 6 Sheets—Sheet 6.
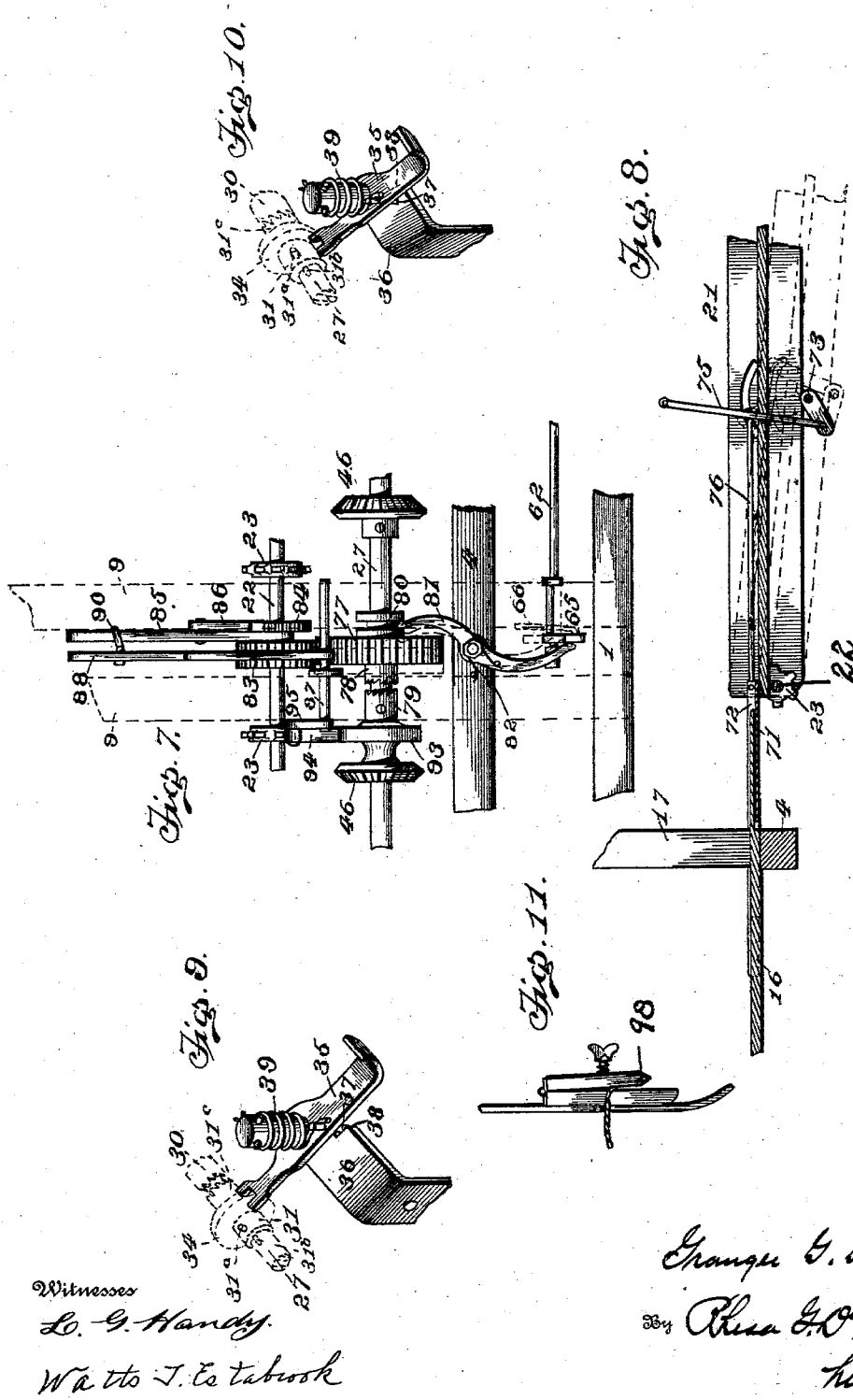

UNITED STATES PATENT OFFICE.

GRANGER G. KIMMELL, OF FARMER, OHIO.

CORN HARVESTER AND SHOCKER.

SPECIFICATION forming part of Letters Patent No. 704,839, dated July 15, 1902.

Application filed May 13, 1901. Serial No. 60,062. (No model.)

*To all whom it may concern:*

Be it known that I, GRANGER G. KIMMELL, a citizen of the United States of America, residing at Farmer, in the county of Defiance and State of Ohio, have invented certain new and useful Improvements in Corn Harvesters and Shockers, of which the following is a specification.

My invention relates to an improvement in corn harvesters and shockers, one of the principal objects being to provide means for simultaneously cutting two rows of corn and carrying the stalks rearwardly by a motion approximately speeded to the forward movement of the machine and finally accelerating that rearward motion when the stalks shall have been tied in a shock, and thereby depositing it upon the ground in a standing position.

Another object is to provide for raising and lowering the platform over which the cut stalks are fed and for accelerating the motion of the stalks over that platform when lowered to cause the discharge of the stalks therefrom.

Another object is to provide improved means for automatically regulating the speed of the endless discharging-apron simultaneously with the raising and lowering of the platform which carries said aprons.

A further object is to provide means for raising and lowering the machine bodily on the wheels which carry it, for tilting the forward end to regulate the cut, and also to provide means for raising and lowering the rear platform with respect to the remaining portion of the machine.

Still further objects are to provide means for packing and confining the stalks as they are cut and fed upon the machine, to facilitate the operation of tying them into a shock preparatory to its being discharged from the machine.

A still further object is to provide means for taking care of the accumulating stalks which are cut during the brief interval while the completed shock is being discharged from the machine.

Still a further object is to provide for regulating the speed of the endless discharging-apron.

With the foregoing objects in view my invention consists in certain novel features of construction and combinations of parts, which will be more fully described hereinafter and particularly pointed out in the claims.

Figure 2:
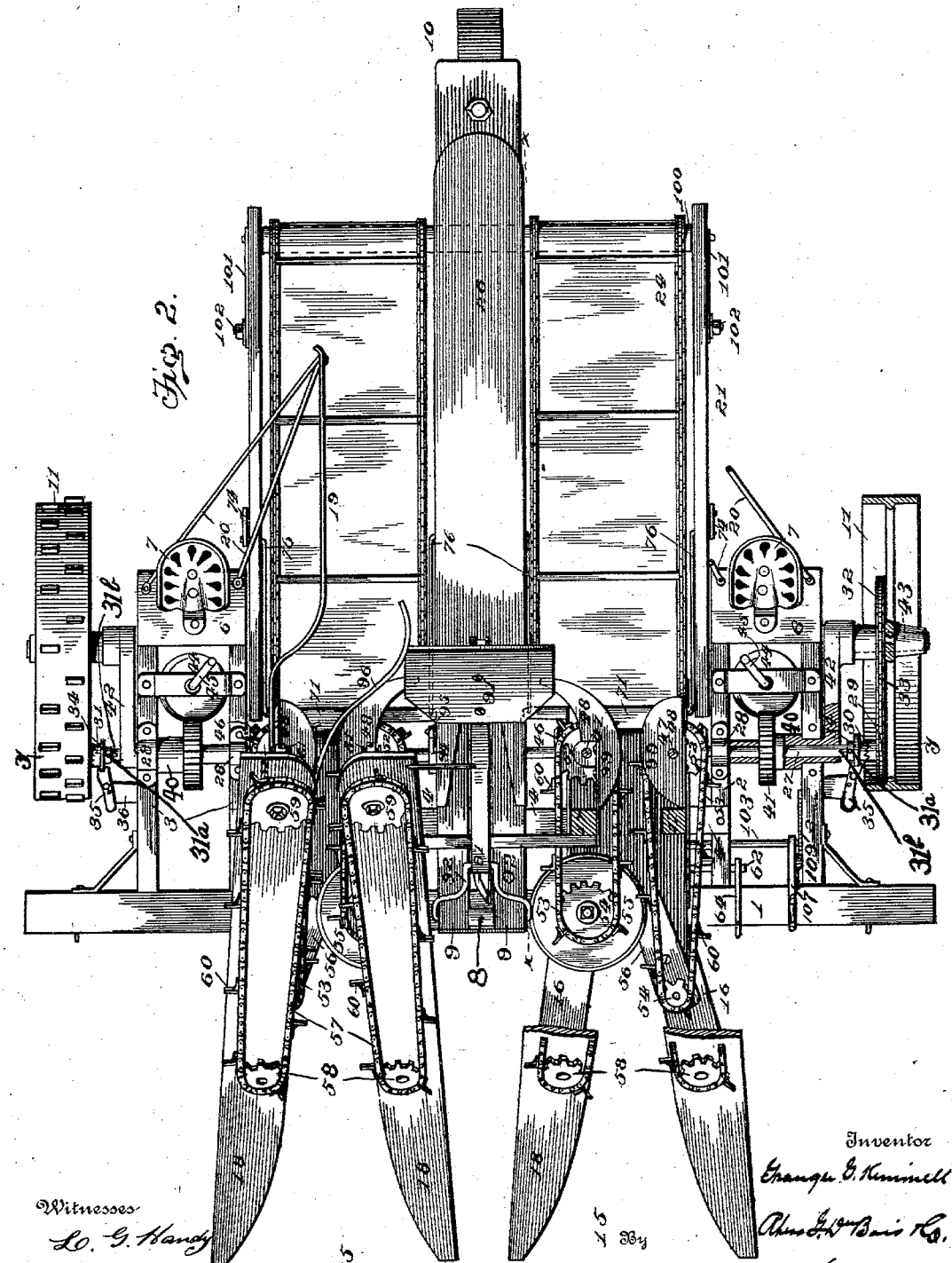
Figure 3:
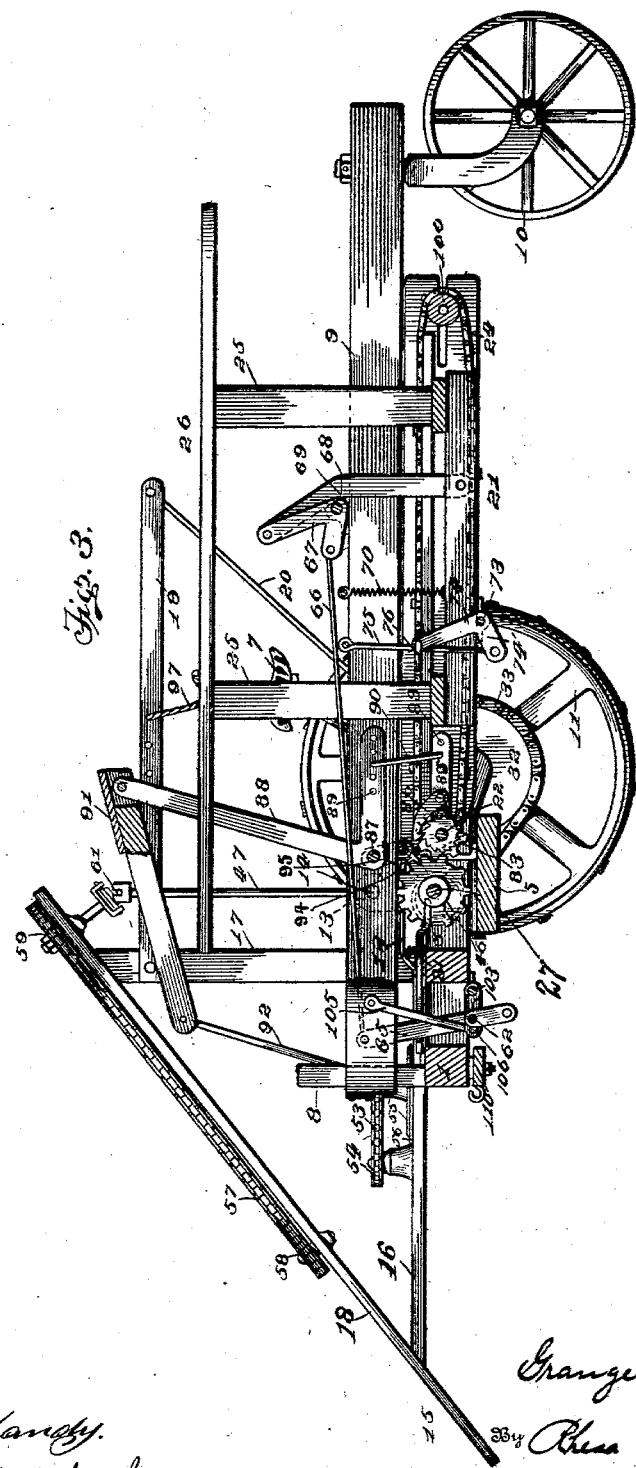
Figure 4:
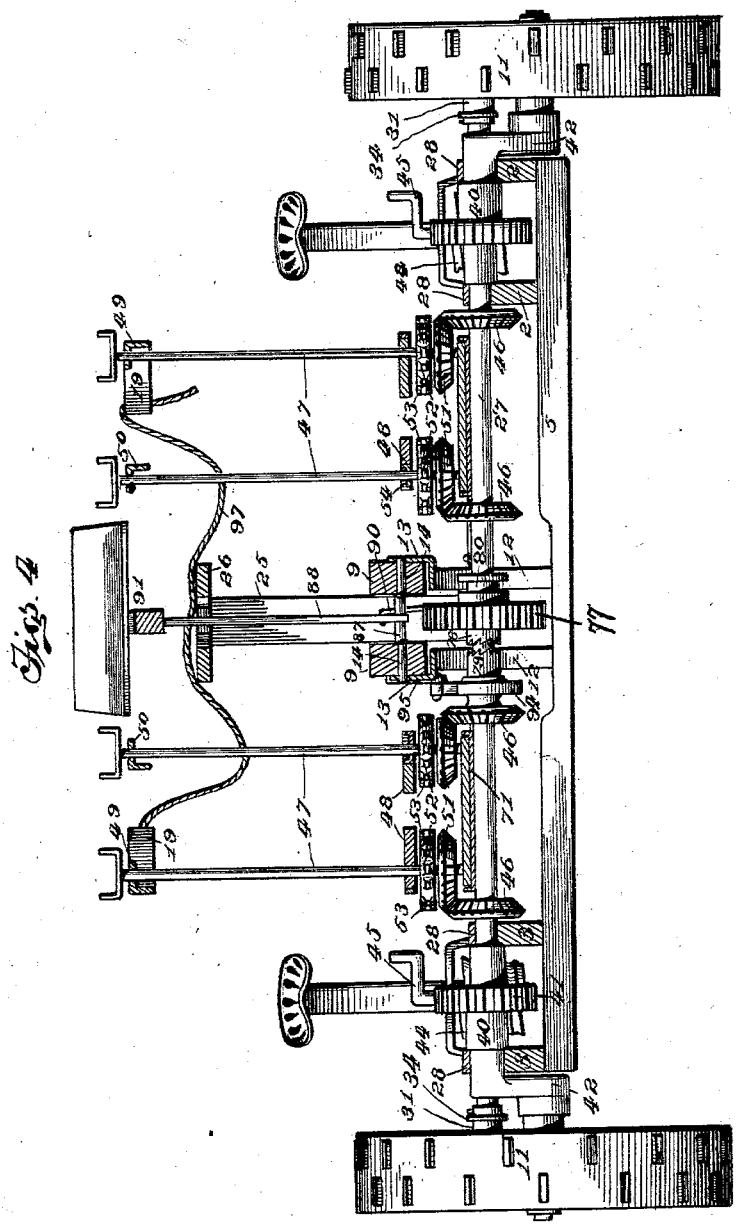

In the accompanying drawings, Figure 1 is a view in side elevation. Fig. 2 is a plan view with parts broken away to show the internal mechanism. Fig. 3 is a vertical longitudinal sectional view on line $x\,x$ of Fig. 2. Fig. 4 is a transverse vertical section on line $y\,y$, Fig. 2, looking rearward. Fig. 5 is a view in perspective of a portion of the machine, including the caster-wheel sills, a portion of the connected framework, uprights, and some of the operating mechanism, such as the levers 64 and 107 and the parts they control. Fig. 6 is a detail in perspective of a portion of this same mechanism on a slightly-enlarged scale. Fig. 7 is an enlarged detail of a portoin of the gearing, center clutch, and shifting devices. Fig. 8 is a detail in longitudinal section through the endless-belt platform, one of the horizontal forks, and sliding shoes. Figs. 9 and 10 are enlarged details showing the means for throwing the machinery out and in gear. Fig. 11 is a view of the tension device, and Fig. 12 is a view in perspective of one of the sliding shoes.

The frame may be variously constructed, although, as shown, it consists, in the main, of a front transverse sill 1, which extends the entire width of the machine, including the wheels, two pairs of rearwardly-extending sills 2 2 and 3 3, the sills in each pair being parallel and moderately close to each other, a cross-beam 4, secured to the inner sills of said pairs of rearwardly-extending sills, and the brace 5, extending across the bottom and secured to said rearwardly-extending sills to hold them securely in position and prevent twisting. On the rear end of the sills 2 2 and 3 3 platforms 6 6 are secured, and the seats 7 7 are mounted on these platforms to accommodate the driver and his assistant, who may be a man and boy, if desired, or two men, for that matter. A post 8 extends upwardly from the center of the front transverse sill 1 and serves as a guide for the caster-wheel sills 9 9, which play on either side of it as the frame is tilted up or down, these caster-sills being securely connected together at their forward and rear ends and being supported at the latter ends by a caster-wheel 10, which, together with the main wheels 11 11 of the machine, constitute the sole support of the entire machine. Brackets 12 12 are secured at their forward and rear ends, respectively, to the transverse sill 1, on either side of the central post 8, and to the brace 5, and they are provided each with an upwardly-projecting jaw 13, to which and between which the caster-wheel sills 9 9 are pivoted by means of bolts or similar devices 14 14, they being the only means of connection between the frame and caster-sills, so that in this way provision is made for tilting the frame on its supporting-wheels with respect to the caster-sills.

Two pairs of guides 15 15, one for each row of cornstalks, are erected on the framework of the machine, and they project forwardly from the front transverse sill 1, to which they are rigidly secured in any approved manner. These guides may be variously constructed, but preferably comprise each a horizontal fork 16 and a pair of uprights 17 17, extending upward from the cross-beam 4, the latter being suitably separated to permit the passage of the cornstalks between them, and from their upper ends the converging inclined guide-bars 18 18 extend downwardly and forwardly to a point some distance below the forward ends of the horizontal forks 16, to which latter they are secured. These guide-bars coöperate with the horizontal forks to straddle the rows of corn as the machine is drawn forwardly, and by their disposition and arrangement absolutely insure the stalks in the two rows being gathered in in a standing position to the cutting mechanism. Guard-arms 19 19 extend rearwardly from the uprights 17 17 a suitable distance back of the seats 7 7 to prevent the cornstalks from dropping over the sides of the machine, and the rear ends of these guard-arms are supported by braces 20 20, which extend upwardly from the platforms 6 6.

The tilting platform 21 is hinged at its forward end on the boxes 21ª, in which the endless-apron shaft 22 revolves, so that the weight of the front end of the platform does not hang on the shaft, and this shaft carries the sprocket-wheels 23 23, which drive the endless aprons 24 24. Platform 21 is provided with two or more uprights 25 25, which extend between the caster-wheel sills 9 9, and on their upper ends is secured the central support 26. This central support is wide enough to prevent the cornstalks from striking the caster-wheel sills, or rather being caught by them, and it coöperates with the guard-arm 19 19 in guiding the stalks during their rearward passage from the machine, in which direction they are carried by the endless aprons 24 24, upon which their butts rest.

Having now described in the main the framework of the machine and only those parts of the structural part of the machine necessarily incident thereto, I will proceed to a detailed description of the mechanism employed for carrying on the various operations of the machine.

The numeral 27 indicates the main drive-shaft. This is journaled in boxes 28 28, secured to the sills 2 2 and 3 3, the shaft preferably extending approximately the entire width of the machine and in any event some distance beyond the outer sills. Sprocket-wheels 29 29 are loosely mounted on the outer ends of this shaft, and on the inner ends of their hubs ratchet-teeth 30 are formed. Collars 31 31 are mounted to slide on the shaft, and they are prevented from turning by the pins 31ª 31ª, operating in elongated slots 31ᵇ 31ᵇ in the shaft. These collars each have ratchet-teeth 31ᶜ on their hubs, adapted to interlock with teeth 30 on the hubs of sprocket-wheels 29 29, whereby to lock the latter to the shaft. These sprocket-wheels 29 29 are preferably driven by large sprocket-wheels 32 32, secured to the main wheels 11 11 through the sprocket-chains 33 33. As a means for throwing the ratchet-teeth 30 and 31ᶜ entirely out of engagement with each other or throwing the machine "out of gear," as is commonly expressed, the collars 31 31 are each provided with a circumferential flange 34, and a spring-actuated hand-lever 35, pivoted to a bracket 36, is provided for shifting each of these sprocket-wheels, said levers terminating at their rearward ends in a fork which straddles the flange and the spring acting to normally swing the rear ends of the levers outward, whereby to keep the machinery in gear, and a downwardly-extending pin 37 on each hand-lever is arranged to engage a shoulder 38 on the bracket 36 to lock the hand-lever against the action of the spring or to hold the machinery out of gear, as shown in Fig. 9, so that in traveling to and from the field the main wheels turn idly without operating any of the machinery. It will be observed that the spring 39, which tends to throw the collar outward on the shaft 27, has the secondary function of holding the hand-lever downward to insure this locked position just previously described. A sleeve 40 is loosely mounted on this main shaft between each pair of sills 2 2 and 3 3, and a worm-wheel 41 is secured to each of these sleeves at a point about midway between the sills, and on their outer ends crank-arms 42 are rigidly secured, said crank-arms carrying axles 43 43, upon which the main wheels 11 11 turn. A worm 44 is located between each pair of sills 2 2 and 3 3, in position to engage the teeth of worm-wheels 41 41, suitable journals being provided therefor, and a hand-crank 45, projecting from the upper end of these worms, is adapted to be turned to the right or left to lower or raise the machine bodily, as the case may be, the worm serving to lock the frame and axle in whatever relative position they may be adjusted with respect to each other. Secured to this main shaft 27 are four beveled gear-wheels 46 46, they being arranged in pairs, the two wheels of each pair disposed with their teeth toward each other and located just forward of the endless aprons and substantially in line therewith and with the guides at the forward end of the machine. Vertical shafts 47 47 are journaled in boxes 48 48, projecting rearwardly from the uprights 17 17, and boxes 49 49, extending inwardly from the guard-arms 19 19 and brackets 50 50 at the upper ends of these uprights. The lower ends of these vertical shafts have beveled gears 51 secured thereon, which mesh with the beveled gear-wheels 46 46 on the main shaft and receive their motion therefrom in opposite directions in each pair. Sprocket-wheels 52 52 are secured to these beveled gears or to the vertical shafts, as preferred, and around them sprocket-chains 53 53 extend, their forward ends passing around sprocket-wheels 54 54, journaled in suitable bearings on the horizontal forks 16. One of these sprocket-wheels 54 is secured to a shaft which carries a rotary cutter 55, (there being one, of course, for each pair or side of the machine,) so that these cutters are driven by the main shaft through the beveled gears 46 51 and sprocket-chains 53. The other sprocket-wheel 54 is located at the outer end of a stationary knife 56, between which and the rotary cutter the stalks are fed backward and cut as rapidly as the machine is drawn forward.

Coacting with the sprocket-chains 53 53 are two other pairs of sprocket-chains 57 57, one pair on each side of the machine, these latter sprocket-chains 57 57 being carried over sprocket-wheels 58 and 59 on top of the guide-bars 18 18. All of these sprocket-chains 53 and 57, eight in number, are preferably provided with projections 60, and operating in unison and being properly timed they combine to carry the cornstalks in a standing position to the cutters and back to the endless aprons at a speed commensurate with the forward travel of the machine across the field, so that clogging and choking of the machine through the "throat," as it might be termed, is absolutely prevented, and, furthermore, each stalk is held in its normal position from the time the horizontal forks of the guides straddle the rows to the time the completed shock leaves the machine. To go back a little, these sprocket-wheels 59 59 at the upper end of the guides are secured on inclining sections of the vertical shaft 47 47, the main and inclining sections being connected by universal joints 61, so that the inclining chains on top of the guides receive their motion from the same source that the chains on the horizontal forks receive theirs.

Proceeding now to the mechanism employed for tilting the platform 21, as well as the central support 26, carried thereby, the numeral 62 represents a rock-shaft supported in suitable boxes 63 63, secured to the frame of the machine, it being provided at one end with a hand-lever 64, by which it is controlled, said hand-lever being located within convenient reach of the occupant of one—say the left-hand—seat of the machine. At or near its opposite end this rock-shaft is provided with an upwardly-projecting arm 65, the latter conveniently projecting up into the space between the caster-wheel sills 9 9, and from its upper end a pitman 66 extends rearward, and its opposite end is pivotally connected to a bell-crank lever 67, fulcrumed on the caster-wheel sills, and from the opposite end of this bell-crank lever a curved link 68 extends downwardly, its lower end being pivotally connected to the tilting platform 21. The object of the curvature at point 69 in this link is to permit the bell-crank lever to swing over its dead-center at the fulcrum and by so doing effectually lock the platform in an elevated position when the hand-lever 64 is swung forward. While this curved link is in the main the sole support of the free end of the tilting platform, yet as a means of facilitating the upward movement of the platform in the operation of raising it to its elevated position the spring 70 is employed, the same extending from some point on the caster-wheel sills to the platform, its function being to partially relieve the excessive weight of the platform and render the raising operation easy. This suspensory spring also prevents the platform from dropping with too great rapidity or force, as it might otherwise do owing to its length and weight.

Sliding shoes 71 71 are provided as a means for catching the accumulated cornstalks forced into the throat during the forward motion of the machine which takes place while the completed shock is being discharged, and these shoes slide far enough over the aprons to catch the stalks which otherwise would drop onto the apron when discharging a shock. These sliding shoes may be made of sheet metal, and they extend loosely beneath the rear ends of the forks 16 16 at their forward ends and over the endless aprons at their rear ends, and they are provided with flanges 72 72 at their edges, which embrace the edge of the rear ends of the forks, thus guiding the sliding shoes in their reciprocating motion. The forward ends of these flanges extend forward some distance beyond the body of the shoes and serve as guides to maintain the shoes in proper position. The shoes are reciprocated simultaneously with the raising and lowering of the platform 21 by the following mechanism: A rock-shaft 73, located in bearings underneath the tilting platform, is provided with two pairs of upwardly-extending arms 74 74', one of which, 74', is in the form of a bell-crank lever connected by a link 75 with the caster-wheel sills, so that the upward and downward movements of the platform through this link 75 causes the shaft to rock back and forward, and the upper ends of the arms 74 74' are connected with the shoes by means of the rods 76 76. Thus as the platform is lowered the link 75 causes the arms 74 74' to swing backward and through the rods 76 76 draw the shoes rearward, and the reverse motion or the raising of the tilting platform causes the arms to swing forward and force the shoes in a corresponding direction under the rear ends of the forks 16 16 out of the way. So it will be understood that the shoes are reciprocated simultaneously with the vibratory motion of the platform—forward as the platform is raised and rearward as it is lowered.

The mechanism for driving the aprons and the packer will now be described.

At a point about centrally located on the main shaft is mounted a gear-wheel 77. This gear-wheel is loose on the shaft, and one end of its hub is provided with a clutch member 78, adapted to be engaged with or disengaged from a corresponding clutch member 79, secured to the shaft. The opposite end of the hub of this gear-wheel 77 has an annular groove 80 formed therein, and a spring-actuated shipper 81, pivoted on cross-beam 4, is adapted to normally hold this gear-wheel clutched to the shaft by the action of the spring 82. The forward end of the shipper is curved laterally in front of and in the path of the upwardly-projecting arm 65 on the rock-shaft 62, so that as the hand-lever 64 is forced forward in the operation of raising the platform the gear-wheel is unclutched by the act of the arm 65 striking the forward end of the shipper and forcing it aside against the action of the spring 82. Shaft 22, which carries the four sprocket-wheels for driving the endless aprons hitherto mentioned, is provided with a pinion 83, adapted to mesh with the gear-wheel 77, and when the gear-wheel 77 is clutched to the main drive-shaft to impart a rapid movement to the shaft 22, whereby to remove the shock from the machine as rapidly as the machine travels forward, which action, of course, takes place when the tilting platform is lowered and simultaneously with the lowering of the said platform. A ratchet-toothed wheel 84 is also secured to the shaft 22 a short distance from the pinion 83, and in the space intervening therebetween, preferably, a loosely-mounted lever 85 is located. This lever is provided with a gravity-pawl 86, which normally engages the teeth of the ratchet-toothed wheel, riding over them as the lever is lifted and engaging one of them with each downward movement of the lever. A rock-shaft 87 is journaled in the caster-wheel sills, and a bell-crank lever 88 is secured thereto. One end of said lever, like the lever 85, is provided with a plurality of holes 89 89, and a link 90 is secured in these holes at different distances from the centers of oscillation of the two levers in order to regulate the rearward movement of the aprons with each step-by-step impulse imparted thereto by the gravity-pawl 86, alternately engaging and carrying backward teeth of the ratchet-toothed wheel 84 on the shaft 22, the adjustment of the link 90 in said holes 89 89 operating to increase or decrease the vibratory movements of the lever 85 to cause this step-by-step movement to vary from a distance corresponding to one or more teeth of the ratchet-toothed wheel, as the case may be, the adjustment shown being the minimum of movement, or a distance corresponding to the size of each tooth. The upper arm of the bell-crank lever 88 is pivotally secured to the packer 91, and the stem of this packer is loosely supported on a vibratory arm 92, pivoted at the extreme forward end of the caster-wheel sills. These parts are actuated by an eccentric 93, secured on the main shaft, and through an eccentric-strap 94, which extends from this eccentric to the outer end of a crank 95 on rock-shaft 87, so that with each rotation of the main shaft the bell-crank lever is positively rocked back and forth and the pawl 86 or the gear-wheel 77 caused to impel the endless aprons, as the case may be—that is to say, when the platform is in a horizontal position or when tilted—and simultaneously with this movement of the aprons the packer is forced rearwardly with sufficient force to pack the stalks into compact form with each rearward impulse. To insure the stalks passing into the path of the packer, curved rods 96 are secured at the upper ends of the guide-frames, and to catch the stalks and hold them during the packing process a cord or rope 97 extends across from one guard-arm 19 to the other, it being secured at one end in one of the holes provided for it in one of the guard-arms and held at the other end in a tension device 98, which is capable of being adjusted to hold the cord with just sufficient rigidity to permit it to slip as the stalks are accumulated and packed thereagainst and until they are tied together by a suitable band previous to being discharged from the machine, at which time the cord is adapted to be released from the tension device until the machine is made ready to form another shock. Thus it will be seen that the cornstalks on both sides of the central support are bound into one large shock anywhere above the central support as tight as possible. When the tilting platform is dropped, the central support and caster-wheel sills pass out through the shock. This will not pull the shock down, for the following two reasons at least—to wit, first, the distance above the central support to the top of the corn is greater than from the central support to the tilting platform, this bringing the central support nearer the bottom of the shock than the top, and, second, the central support has a tendency to slip out, owing to the shock standing at an angle, as it does in discharging, to the central support, the aprons revolving rearward at the same speed that the machine travels forward, as it were, downhill, on the platform, and from actual experience in the field with a machine of this character I know that a shock made this way will stand and that the machine will not pull it down in discharging it from the platform.

To go back slightly, mention may be made at this point of the guards 99 99 at the throat of the machine, just separated far enough to permit the passage of a single stalk at a time between them, and also of the single roller 100 at the rear end of the tilting platform, around which the aprons pass, which roller is an idle roller, made adjustable in and out by the plates 101 101 and the set-screw 102 for regulating the tension of the aprons.

The forward end of the machine is capable of being tilted by any suitable mechanism—as, for instance, the following: A rock-shaft 103, supported in boxes 104 104, secured to the frame of the machine, is provided at one end with a link 105, pivotally secured to the forward end of the caster-wheel sills and connected to the shaft through a crank-arm 106. At the opposite end of the rock-shaft or at some convenient point thereon a hand-lever 107 is secured, this being provided with the usual latch 108, adapted to engage the teeth of a segment 109. It is of course understood that by throwing this lever forward the forward end of the machine is raised and by tilting it rearward the forward end of the machine is tilted downward.

A doubletree or evener of any approved pattern is conveniently pivoted at a point beneath the front transverse sill 1, and two or three draft-animals may be hitched to this evener 110, as desired.

While for the most part the operation has been described, to briefly recapitulate: The machine is drawn forward, so that two rows of standing corn are straddled by the guide-frames, they being caught and held in their standing position by the sprocket-chains, which are speeded as near as possible to the speed of the machine, so that they in reality act passively upon the standing corn, holding it in its normal position. Meanwhile the machine advances until the corn reaches the cutters, which sever it, the chains now acting to carry the cut stalks rearward until they are engaged by the packer and transferred to the endless aprons, which move back by step-by-step movement, which are likewise speeded as near as possible to the motion of the machine. When a sufficient quantity of the stalks shall have been packed into the embrace of the cord or rope 97 to form a shock of adequate size, the team is stopped, and with of course the machinery the shock is securely bound by a cornstalk, cord, or other binder, the tilting platform lowered, and the machine is then started and the shock is discharged from the machine upon the ground in standing position. Meanwhile the stalks which are cut during this discharging action of the machine, which are trifling in number, have no more than filled the throat of the machine, and the platform at this time being immediately raised is made to assume its normal position in ample time to again slowly feed the stalks rearward until enough are again accumulated to form another shock, when the operation is repeated. Of course it is understood that the stalks are guided and confined in their rearward movement by the central support and guard-arms, the central support preventing their dropping against or between the caster-wheel sills and also retaining them in their upright position, and in the upward and downward adjustment of the tilting platform the latter is prevented from lateral twisting or movement by the uprights, which carry the central support, just fitting and sliding nicely between these sills.

It is evident that slight changes might be made in the form and arrangement of many of the parts described, which changes it is unnecessary to specify, without departing from the spirit and scope of my invention, and hence I do not wish to limit myself to the exact construction herein set forth; but, Having fully described my invention, what I claim as new, and desire to secure by Letters Patent, is—

1. In a corn harvester and shocker, the combination with a suitable frame and caster-wheel sills, the frame and sills having a hinged or pivotal connection with each other, of a tilting platform hinged to the frame, said platform carrying uprights which have sliding connection with the caster-wheel sills, whereby a lateral twisting of either is prevented and a central support secured on the upper ends of these uprights.

2. In a corn harvester and shocker, the combination with a suitable frame and caster-wheel sills, connected therewith, of a tilting platform hinged to the frame, said platform carrying uprights which have sliding connection with the caster-wheel sills, whereby a lateral twisting of either is prevented and a central support secured on the upper ends of these uprights.

3. In a corn harvester and shocker, the combination with a suitable frame and caster-wheel sills, connected therewith, of a tilting platform carrying uprights which have sliding connection with the caster-wheel sills, whereby a lateral twisting of either is prevented and a central support secured on the upper ends of these uprights.

4. The combination with a suitable frame and caster-wheel sills connected therewith, of a tilting platform and means for raising and lowering said platform, said means operating to automatically lock the platform when adjusted to its elevated position, and a spring suspensory device connected to the platform for assisting in raising it.

5. The combination with a suitable frame and a pair of caster-wheel sills suitably spaced apart and connected with the frame, of a tilting platform having uprights fitted and guided between the caster-wheel sills and adapted to be raised and lowered therebetween in the operations of moving the platform, whereby to prevent lateral motion of either of said parts with respect to the other, and a central support secured on the upper ends of said uprights.

6. The combination with a suitable frame and a pair of caster-wheel sills suitably spaced apart and connected with the frame, of a tilting platform having uprights fitted to and guided between the space intervening between the caster-wheel sills and adapted to be raised and lowered therebetween in the operations of moving the platform, whereby to prevent lateral movement of either of said parts with respect to the other, a central support secured on the upper ends of said uprights, a bell-crank located on the sills, a curved link extending from one end of this bell-crank, between the sills, to the platform and means for rocking the bell-crank lever whereby to throw the bell-crank and link over the dead-center of the bell-crank and cause the platform to lock, and a spring suspensory device depending from the sills through the space between them, to the platform whereby to facilitate the raising of the latter.

7. The combination with a suitable frame and tilting platform hinged thereto, said platform having endless aprons arranged to traverse it, of sliding shoes adapted to hold the stalks that have accumulated when the platform is tilted downward and means connected with the platform and with the shoes for simultaneously reciprocating the latter with the movements of the platform.

8. The combination with a suitable frame, of a tilting platform having hinged connection therewith, endless aprons carried over said platform, a rock-shaft supported in boxes carried by the platform, said shaft having arms thereon one in the form of a bell-crank lever, a link connecting one end of this lever with a suitable stationary support, sliding shoes adapted to bridge the space between the frame and the adjacent ends of the platform and connecting-rods extending from the shoes to the arms on the rock-shaft.

9. The combination with a suitable frame, of a tilting platform having hinged connection therewith, endless aprons carried over said platform, a rock-shaft supported in boxes carried by the platform, said shaft having arms thereon, one in the form of a bell-crank lever, a link connecting one end of this lever with a suitable stationary support, sliding shoes adapted to bridge the space between the frame and the adjacent end of the platform, connecting-rods extending from the arms to the shoes and means for raising and lowering the platform with respect to the frame during the simultaneous sliding motions of the shoes.

10. The combination with a main frame, guide-frames and means for feeding cornstalks in standing position through the guide-frames and for cutting the stalks during their passage therethrough, of a tilting frame, endless aprons carried thereon, a central support connected with the platform, guide-bars, a cord extending from one guide-bar to the other, a packer for packing the stalks on either side of the central support against the cord and caster-wheel sills for guiding the tilting platform and preventing lateral movement thereof.

11. The combination with a suitable frame and tilting platform hinged thereto, said platform carrying endless aprons of a main shaft and a sprocket-wheel shaft carried by the main frame and intergeared with each other, a clutch for throwing these two shafts into or out of gear with each other and means driven by the main shaft for imparting a step-by-step movement to the sprocket-shaft.

12. The combination with a suitable frame and platform hinged thereto, said platform carrying endless aprons, of a drive-shaft, means for driving the latter, a gear-wheel loosely mounted on said shaft, a shipper for clutching it to the shaft, means for tilting the platform, said shipper in position to be operated by said means when the platform is thrown to one of its extreme positions, means for imparting a step-by-step motion to the endless-apron-driving shaft when the gear-wheel is released from the drive-shaft and means for adjusting the throw of said step-by-step driving mechanism.

13. The combination with a suitable frame, a tilting platform, said platform carrying an endless apron and means for raising and lowering and locking the platform, of a drive-shaft, an apron-driving shaft which receives motion from the main shaft when the tilting platform is in one of its positions and a step-by-step escapement mechanism for imparting intermittent motion to the apron when the platform is in its other extreme position.

14. The combination with a suitable frame, a tilting platform, said platform carrying an endless apron and means for raising and lowering and locking the platform, of a drive-shaft, an apron-driving shaft which receives motion from the main shaft when the tilting platform is in one of its positions, a step-by-step escapement mechanism for imparting intermittent motion to the apron when the platform is in its other extreme position, and means for adjusting the throw of the escapement mechanism.

15. The combination with a suitable frame and a platform having hinged connection therewith, of a main drive-shaft having a gear-wheel loosely mounted thereon, means for locking said gear-wheel to the shaft, means for tilting the platform and simultaneously causing the lock or release of the said gear-wheel, a shaft carrying sprocket-wheels and provided with a pinion adapted to be driven by the gear-wheel on the main shaft when said gear-wheel is locked to said main shaft, a ratchet-toothed wheel secured to the shaft which carries the sprocket-wheels, an eccentric carried by the main shaft, a rock-shaft having a bell-crank lever thereon, an eccentric-strap extending from the eccentric to a crank on the rock-shaft, a packer connected with the bell-crank lever and means for adjusting the throw of said packer.

16. The combination with a main frame, a main shaft revolubly supported therein, means for driving said shaft and a tilting platform having hinged connection with the main frame, said platform carrying endless aprons, of caster-wheel sills, a central support, uprights extending from the platform between the sills, to which the central support is secured, a shaft for driving the endless aprons, gearing for imparting a continuous motion to said apron-driving shaft when the tilting platform is in one of its positions, means for imparting a step-by-step motion to the endless aprons when the platform is in its other extreme position, a packer and guide-bars between which and the central support, the stalks are packed, a cord for receiving said stalks, guide-frames, cutters therein and feed mechanisms, substantially as described.

17. The combination with a frame, a platform, endless aprons, shaft for imparting motion to the latter, of a main drive-shaft having an eccentric thereon, a packer operated by the eccentric, and means extending from and supporting the packer for communicating motion to the apron-shaft.

18. The combination with a frame, a platform, endless aprons, shaft for imparting motion to the latter, of a main drive-shaft having an eccentric thereon, a packer operated by the eccentric, and means extending from and supporting the packer for communicating intermittent motion to the apron-shaft.

19. The combination with a frame, a platform connected therewith, endless aprons carried by the platform, a shaft for driving the aprons, said shaft having a ratchet-toothed wheel thereon, of a main drive-shaft, a packer driven thereby, a bell-crank lever supporting the packer, a lever having a pawl pivoted thereto adapted to engage the teeth of the ratchet-toothed wheel to impart intermittent impulses thereto, and a link connecting the two levers whereby motion is imparted from one lever to the other.

20. The combination with a frame, a platform connected therewith, endless aprons carried by the platform, a shaft for driving the aprons, said shaft having a ratchet-toothed wheel thereon, of a main drive-shaft, a packer driven thereby, a bell-crank lever supporting the packer, a lever having a pawl pivoted thereto adapted to engage the teeth of the ratchet-toothed wheel to impart intermittent impulses thereto, and a link connecting the two levers whereby motion is imparted from one lever to the other, and means for varying the adjustment of said link, whereby to increase or decrease the extent of vibratory movements of the lever which carries the pawl.

21. The combination with a frame, and a tilting platform, said platform carrying an endless apron, of a drive-shaft, an apron-driving shaft which receives motion from said shaft when the tilting platform is in one of its positions, and a step-by-step escapement mechanism for imparting intermittent motion to the apron when the platform is in its other extreme position.

In testimony whereof I have signed my name to this specification in the presence of two subscribing witnesses.

GRANGER G. KIMMELL.

Witnesses:
J. D. CAMPBELL,
J. M. CALKINS.